US012110854B2

(12) United States Patent
Usui et al.

(10) Patent No.: US 12,110,854 B2
(45) Date of Patent: Oct. 8, 2024

(54) FUEL PUMP

(71) Applicant: Hitachi Astemo, Ltd., Hitachinaka (JP)

(72) Inventors: Satoshi Usui, Hitachinaka (JP); Minoru Hashida, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 18/035,384

(22) PCT Filed: Aug. 30, 2021

(86) PCT No.: PCT/JP2021/031698
§ 371 (c)(1),
(2) Date: May 4, 2023

(87) PCT Pub. No.: WO2022/130698
PCT Pub. Date: Jun. 23, 2022

(65) Prior Publication Data

US 2023/0407828 A1 Dec. 21, 2023

(30) Foreign Application Priority Data

Dec. 17, 2020 (JP) ................................ 2020-208977

(51) Int. Cl.
*F02M 59/46* (2006.01)
*F02M 55/04* (2006.01)

(52) U.S. Cl.
CPC ............ *F02M 55/04* (2013.01); *F02M 59/46* (2013.01); *F02M 2200/315* (2013.01)

(58) Field of Classification Search
CPC ...... F02M 59/44; F02M 59/46; F02M 59/462; F02M 59/464; F02M 59/466; F02M 59/468; F02M 59/48; F02M 59/485; F02M 59/00; F02M 59/366
See application file for complete search history.

(56) References Cited

U.S. PATENT DOCUMENTS

| | | | |
|---|---|---|---|
| 2010/0242922 A1 | 9/2010 | Mancini et al. | |
| 2013/0098338 A1 | 4/2013 | Usui et al. | |
| 2017/0306905 A1 | 10/2017 | Usui et al. | |
| 2018/0313314 A1 | 11/2018 | Scheller et al. | |
| 2019/0301413 A1 | 10/2019 | Ogane | |
| 2019/0301626 A1* | 10/2019 | Kaneko | F16K 15/025 |

FOREIGN PATENT DOCUMENTS

| | | | |
|---|---|---|---|
| EP | 2236809 A2 | | 10/2010 |
| EP | 3205873 A1 | | 8/2017 |
| JP | 2018-523778 A | | 8/2018 |
| JP | 2020-045891 A | | 3/2020 |
| KR | 20190032806 A | * | 3/2019 |
| WO | 2013/035132 A1 | | 3/2013 |

OTHER PUBLICATIONS

Extended European Search Report issued on Aug. 21, 2024 for European Patent Application No. 21906063.9.

* cited by examiner

*Primary Examiner* — George C Jin
*Assistant Examiner* — Teuta B Holbrook
(74) *Attorney, Agent, or Firm* — Volpe Koenig

(57) ABSTRACT

A fuel pump includes a damper, a suction valve chamber, a pressurization chamber, a relief valve chamber, a relief valve mechanism, and a shock wave absorber. The shock wave absorber is provided in the relief valve chamber, and is disposed to face the relief valve holder on the downstream side in the direction in which the relief valve holder moves when the relief valve mechanism is released.

6 Claims, 8 Drawing Sheets

FUEL PUMP

TECHNICAL FIELD

The present invention relates to a fuel pump for an internal combustion engine of an automobile.

BACKGROUND ART

In direct injection engines in which fuel is directly injected into the combustion chamber of an engine (internal combustion engine) of an automobile or the like, a high-pressure fuel pump for raising the pressure of fuel is widely used. A conventional technology for the high-pressure fuel pump is disclosed, for example, in PTL 1.

PTL 1 relates to a fuel high-pressure pump equipped with a housing, and discloses a technology in which a pressure-limiting valve is disposed in a hole within the housing, and the hole opens into the supply volume chamber of a low-pressure supply unit.

PATENT LITERATURE

Citation List

PTL 1: JP 2018-523778 A

SUMMARY OF INVENTION

Technical Problem

In addition, in the technology disclosed in PTL 1, a relief valve chamber in which a relief valve mechanism is disposed is directly connected to a suction valve chamber in order to ensure the flow rate of fuel supplied to a pressurization chamber. However, in recent years, as the pressure of the fuel pump increases, the pressure for releasing the relief valve mechanism increases, and the shock wave generated when the relief valve mechanism is released also increases. As a result, in the technology disclosed in PTL 1, the shock wave generated when the relief valve mechanism is released may damage mechanical components, such as a pressure pulsation reduction mechanism and a low pressure pipe, arranged upstream of the relief valve mechanism.

In consideration of the above problems, an object of the present invention is to provide a fuel pump capable of suppressing damage to each mechanical component due to the shock wave generated when a relief valve mechanism is released.

Solution to Problem

In order to address the above problems and achieve the object of the present invention, a fuel pump according to the present invention includes a damper, a suction valve chamber, a pressurization chamber, a relief valve chamber, a relief valve mechanism, and a shock wave absorber. The suction valve chamber communicates with the damper through a suction passage. The pressurization chamber is formed downstream of the suction valve chamber. The relief valve chamber is formed downstream of the pressurization chamber. The relief valve mechanism is disposed in the relief valve chamber and has a relief valve holder. The shock wave absorber is provided in the relief valve chamber, and is disposed to face the relief valve holder on the downstream side in the direction in which the relief valve holder moves when the relief valve mechanism is released.

Advantageous Effects of Invention

With the fuel pump having the above configuration, it is possible to suppress damage to each mechanism component due to the shock wave generated when the relief valve mechanism is released.

Note that problems, configurations, and effects other than those described above will be clarified by the following description of an embodiment.

BRIEF DESCRIPTION OF DRAWINGS

FIG. 7 illustrates a shock wave absorber and a supply communication hole in the high-pressure fuel pump according to the embodiment of the present invention.

FIG. 8 illustrates another example of a supply communication hole in the high-pressure fuel pump according to the embodiment of the present invention.

DESCRIPTION OF EMBODIMENT

Figure 1:
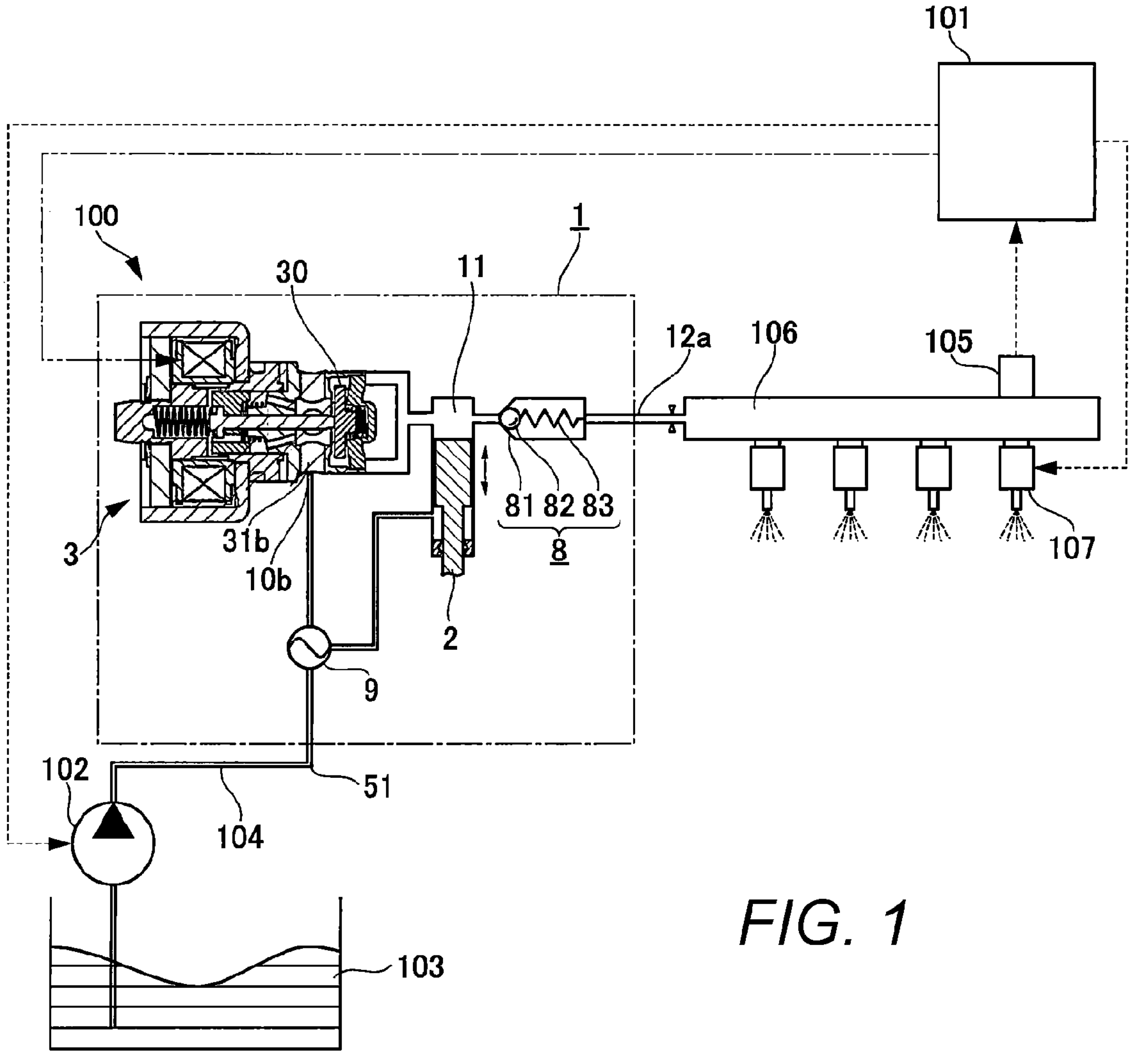
FIG. 1 is an overall configuration diagram of a fuel supply system using a high-pressure fuel pump according to one embodiment of the present invention.

1. One Embodiment of High-Pressure Fuel Pump

Hereinafter, a high-pressure fuel pump according to one embodiment of the present invention will be described. Note that in the drawings, common members are denoted by the same reference numerals.

[Fuel Supply System]

First, a fuel supply system using the high-pressure fuel pump according to the present embodiment will be described with reference to FIG. 1.

FIG. 1 is an overall configuration diagram of the fuel supply system using the high-pressure fuel pump according to the present embodiment.

As illustrated in FIG. 1, the fuel supply system is equipped with a high-pressure fuel pump 100, an engine control unit (ECU) 101, a fuel tank 103, a common rail 106, and a plurality of injectors 107. The components of the high-pressure fuel pump 100 are integrally incorporated in a pump body 1.

The fuel in the fuel tank 103 is pumped up by a feed pump 102 that is driven on the basis of signals from the ECU 101. The pumped fuel is pressurized to an appropriate pressure by a pressure regulator (not illustrated) and sent through a low-pressure pipe 104 to a low-pressure fuel suction port 51 that is provided in a suction joint 5 (see FIG. 2) of the high-pressure fuel pump 100.

The high-pressure fuel pump 100 pressurizes the fuel supplied from the fuel tank 103 and force-feeds the fuel to the common rail 106. The plurality of injectors 107 and a fuel pressure sensor 105 are mounted on the common rail 106. The plurality of injectors 107 are mounted in accordance with the number of cylinders (combustion chambers), and inject fuel according to a drive current output from the ECU 101. The fuel supply system according to the present embodiment is a so-called direct injection engine system in which the injectors 107 directly inject fuel into the cylinder of an engine.

The fuel pressure sensor 105 outputs the detected pressure data to the ECU 101. The ECU 101 calculates an appropriate injection fuel amount (target injection fuel length), an appropriate fuel pressure (target fuel pressure), and the like on the basis of engine state quantities (such as crank rotation angle, throttle opening, engine speed, and fuel pressure) obtained from various sensors.

In addition, the ECU 101 controls driving of the high-pressure fuel pump 100 and the plurality of injectors 107 on the basis of the calculation results of the fuel pressure (target fuel pressure) and the like. That is, the ECU 101 has a pump control unit that controls the high-pressure fuel pump 100 and an injector control unit that controls the injectors 107.

The high-pressure fuel pump 100 has a plunger 2, a pressure pulsation reduction mechanism 9, an electromagnetic suction valve mechanism 3 which is a variable displacement mechanism, a relief valve mechanism 4 (see FIG. 2), and a discharge valve mechanism 8. The fuel flowing from the low-pressure fuel suction port 51 reaches a suction port 31*b* of the electromagnetic suction valve mechanism 3 through the pressure pulsation reduction mechanism 9 and a suction passage 10*b*.

The fuel flowing into the electromagnetic suction valve mechanism 3 passes through a suction valve 32, flows through a supply communication hole 1*g* (see FIG. 2) formed in the pump body 1, and then flows into a pressurization chamber 11. The pump body 1 slidably holds the plunger 2. The plunger 2 is powered by a cam 91 (see FIG. 2) of the engine and reciprocates. One end of the plunger 2 is inserted into the pressurization chamber 11 to increase or decrease the volume of the pressurization chamber 11.

In the pressurization chamber 11, fuel is sucked from the electromagnetic suction valve mechanism 3 during the downward stroke of the plunger 2, and is pressurized during the upward stroke of the plunger 2. When the fuel pressure in the pressurization chamber 11 exceeds a preset value, the discharge valve mechanism 8 opens, and the high-pressure fuel is force-fed to the common rail 106 through a discharge passage 12*a* of a discharge joint 12. The fuel discharge by the high-pressure fuel pump 100 is operated by opening and closing the electromagnetic suction valve mechanism 3. Furthermore, the opening and closing of the electromagnetic suction valve mechanism 3 is controlled by the ECU 101.

When an abnormal high pressure occurs in the common rail 106 or the like due to a failure of the injectors 107 or the like, and the differential pressure between the discharge passage 12*a* of the discharge joint 12 communicating with the common rail 106 and the pressurization chamber 11 becomes equal to or greater than the valve opening pressure (predetermined value) of the relief valve mechanism 4, the relief valve mechanism 4 opens. Thus, the abnormally high pressure fuel is returned to the pressurization chamber 11 through the interior of the relief valve mechanism 4. As a result, piping, such as the common rail 106, is protected.

[High-Pressure Fuel Pump]

Next, the configuration of the high-pressure fuel pump 100 will be described with reference to FIGS. 2 to 5.

Figure 2:
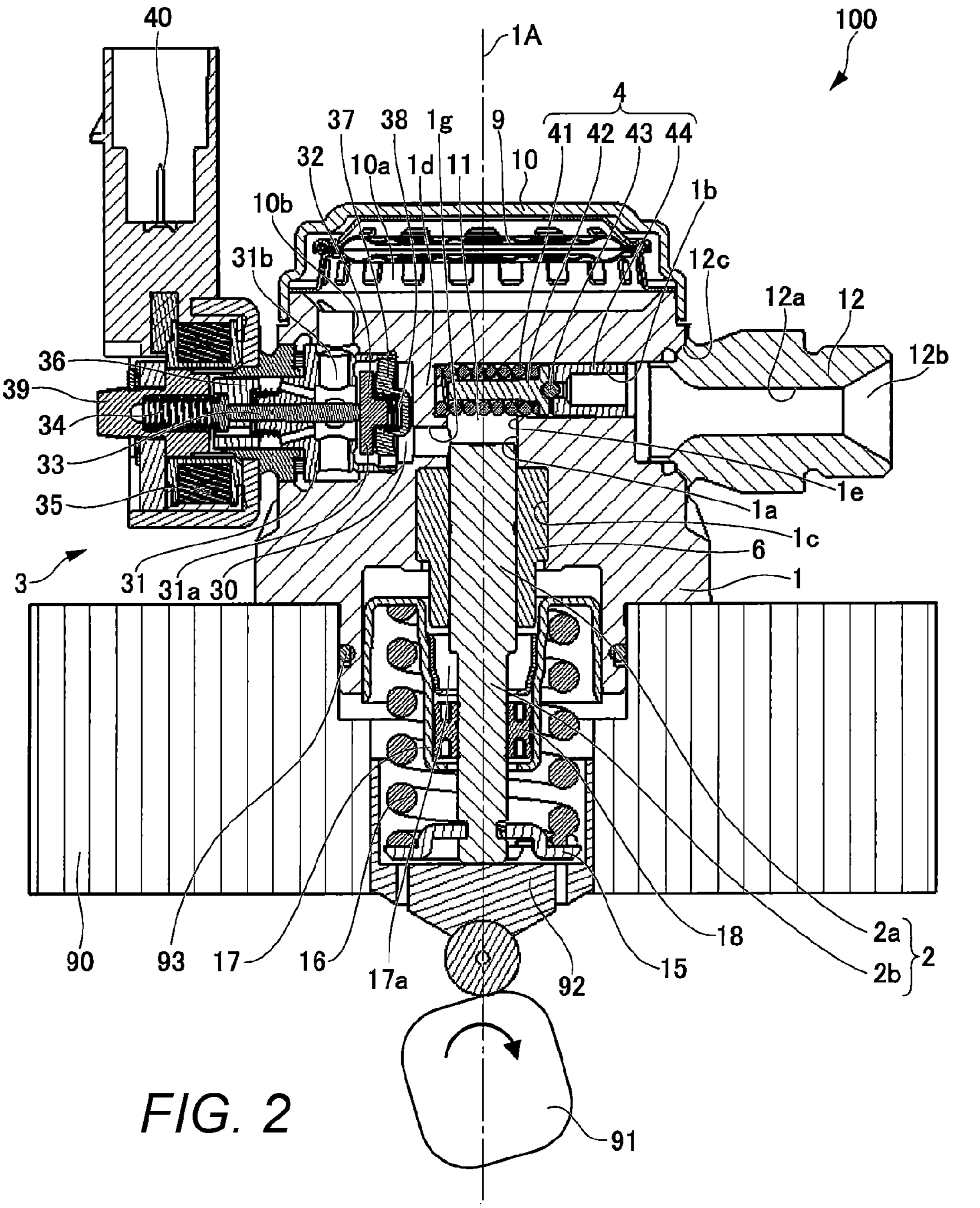
FIG. 2 is a longitudinal sectional view (Part 1) of the high-pressure fuel pump according to the embodiment of the present invention.
Figure 3:
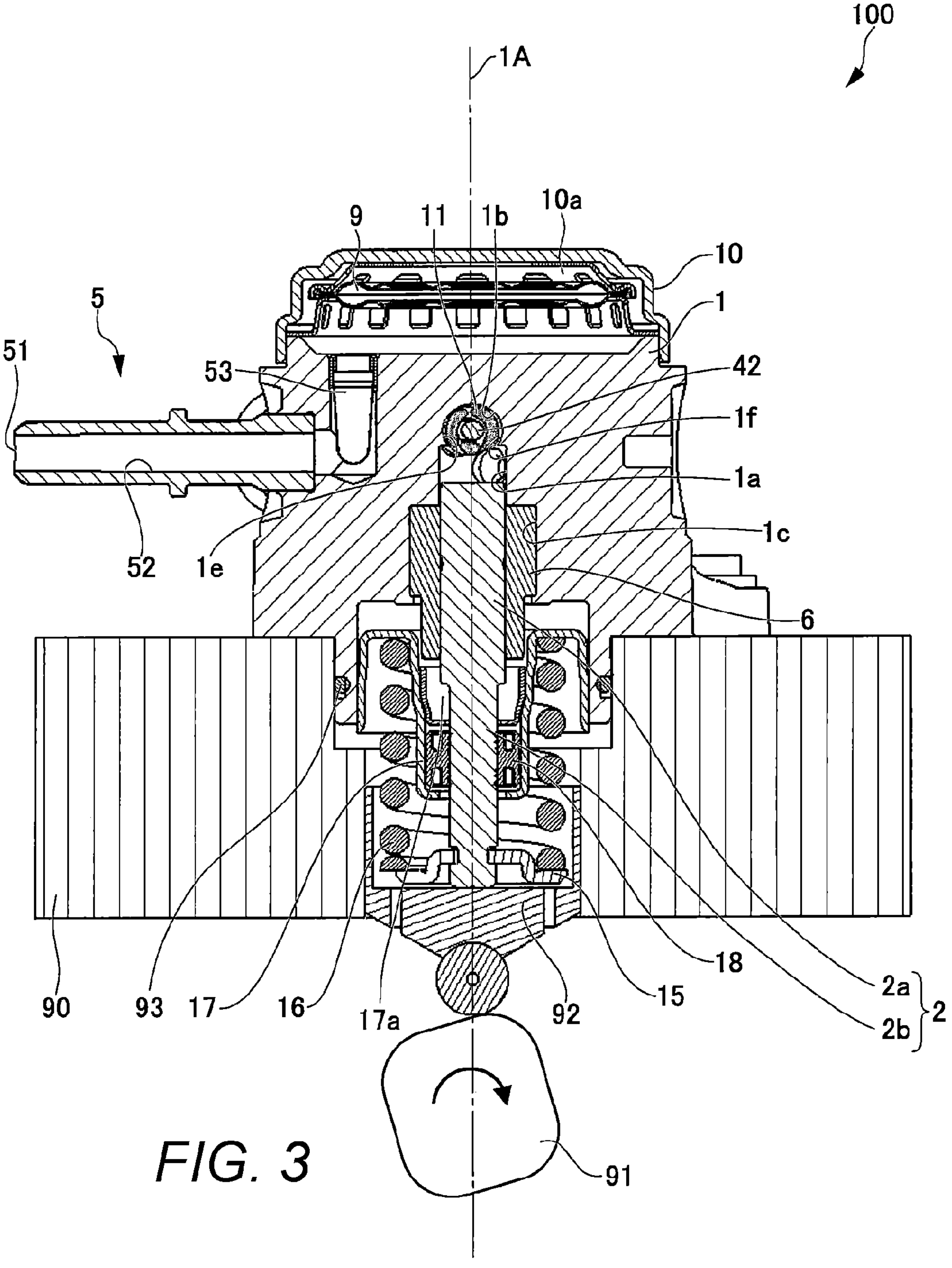
FIG. 3 is a longitudinal sectional view (Part 2) of the high-pressure fuel pump according to the embodiment of the present invention.
Figure 4:
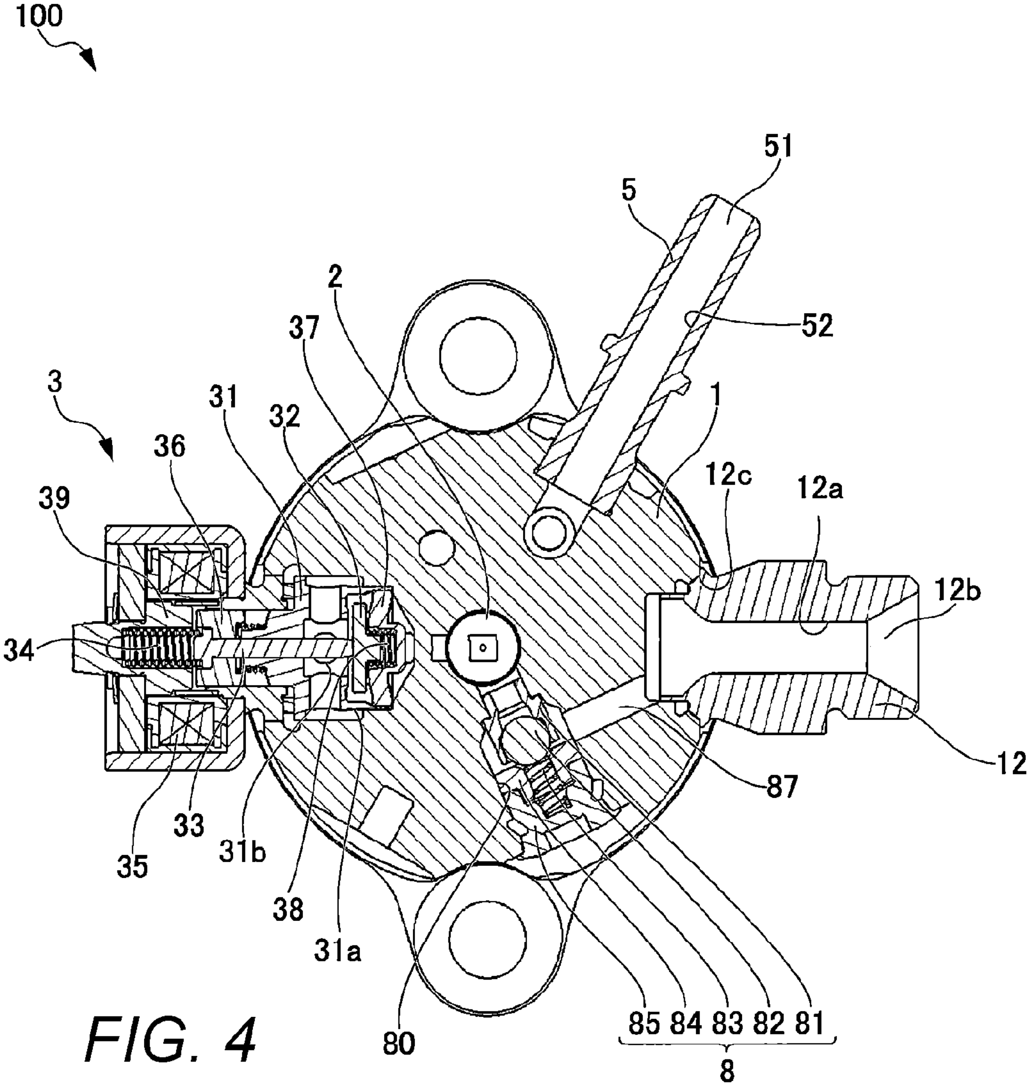
FIG. 4 is a horizontal sectional view of the high-pressure fuel pump according to the embodiment of the present invention as viewed from above.
Figure 5:
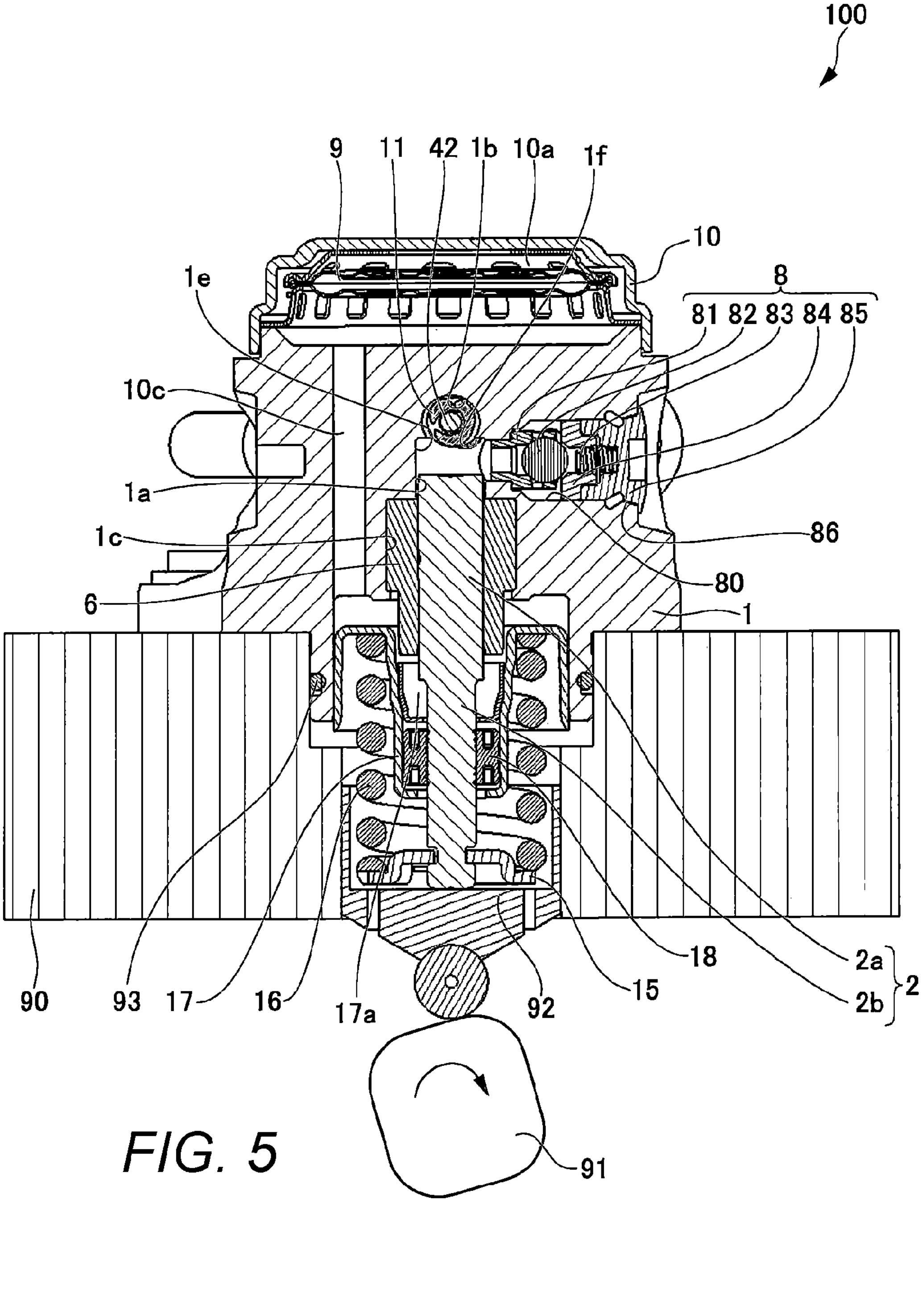
FIG. 5 is a longitudinal sectional view (Part 3) of the high-pressure fuel pump according to the embodiment of the present invention.

FIG. 2 is a longitudinal sectional view (Part 1) of the high-pressure fuel pump 100 as viewed in a cross section orthogonal to the horizontal direction. FIG. 3 is a longitudinal sectional view (Part 2) of the high-pressure fuel pump 100 as viewed in a cross section orthogonal to the horizontal direction. FIG. 4 is a horizontal sectional view of the high-pressure fuel pump 100 as viewed in a cross section orthogonal to the vertical direction. In addition, FIG. 5 is a longitudinal sectional view (Part 3) of the high-pressure fuel pump 100 as viewed in a cross section orthogonal to the horizontal direction.

As illustrated in FIGS. 2 to 5, the pump body 1 of the high-pressure fuel pump 100 is formed in a substantially columnar shape. As illustrated in FIGS. 2 and 3, the pump body 1 has an interior in which a first chamber 1*a*, a second chamber 1*b*, a third chamber 1*c*, a shock wave absorber 1*d*, the supply communication hole 1*g*, and a suction valve chamber 30 are provided. In addition, the pump body 1 is in close contact with a fuel pump attachment portion and is fixed by a plurality of bolts (screws) (not illustrated).

The first chamber 1*a* is a columnar space provided in the pump body 1, and the centerline LA of the first chamber 1*a* coincides with the centerline of the pump body 1. One end of the plunger 2 is inserted into the first chamber 1*a*, and the plunger 2 reciprocates within the first chamber 1*a*. The pressurization chamber 11 is formed by the first chamber 1*a* and one end of the plunger 2. In addition, the first chamber 1*a* communicates with the suction valve chamber 30 through the supply communication hole 1*g* to be described later. The second chamber 1*b* serving as a relief valve chamber is formed downstream of the pressurization chamber 11.

The second chamber 1*b* is a columnar space provided in the pump body 1, and the centerline of the second chamber 1*b* is orthogonal to the centerline of the first chamber 1*a*. The relief valve mechanism 4 to be described later is disposed in the second chamber 1*b* to form a relief valve chamber. Note that the diameter of the second chamber 1*b* serving as a relief valve chamber is smaller than the diameter of the first chamber 1*a*.

In addition, the first chamber 1*a* and the second chamber 1*b* communicate with each other through a circular communication hole 1*e*. The diameter of the communication hole 1*e* is the same as the diameter of the first chamber 1*a*, and the communication hole 1*e* extends one end of the first chamber 1*a*. Furthermore, the diameter of the communication hole 1*e* is larger than the outer diameter of the plunger 2. Thus, the plunger 2 reciprocating in the pressurization chamber 11 does not collide with the periphery of the communication hole 1*e*, thereby allowing an improvement in the durability of the plunger 2.

In addition, the centerline of the communication hole 1*e* is orthogonal to the centerline of the second chamber 1*b*. Thus, the fuel that has passed through the relief valve mechanism 4 can efficiently pass through the communication hole 1*e*, so that the improvement in relief performance is not hindered. In addition, the shape of the pump body 1 can be prevented from becoming complicated, and the productivity of the pump body 1 and the high-pressure fuel pump 100 can be improved.

As illustrated in FIGS. 3 and 5, the diameter of the communication hole 1*e* is larger than the diameter of the second chamber 1*b*. Furthermore, the communication hole 1*e* has a tapered surface 1*f*, the diameter of which decreases toward the second chamber 1*b*, in a cross section orthogonal to the centerline of the second chamber 1*b*. Thus, the fuel that has passed through the relief valve mechanism 4 disposed in the second chamber 1*b* can smoothly return to the pressurization chamber 11 along the tapered surface 1*f*.

The third chamber 1*c* is a columnar space provided in the pump body 1 and is continuous with the other end of the first chamber 1*a*. The centerline of the third chamber 1*c* coincides with the centerline 1A of the first chamber 1*a* and the centerline of the pump body 1, and the diameter of the third chamber 1*c* is larger than the diameter of the first chamber 1*a*. A cylinder 6 that guides the reciprocation of the plunger 2 is disposed in the third chamber 1*c*. This allows the end face of the cylinder 6 to abut on a stepped portion between the first chamber 1*a* and the third chamber 1*c*, thereby preventing the cylinder 6 from being displaced toward the first chamber 1*a*.

The cylinder 6 is formed in a tubular shape, and is press-fitted into the third chamber 1*c* of the pump body 1 on the outer peripheral side thereof. Furthermore, one end of the cylinder 6 abuts on a stepped portion, which is the top surface of the third chamber 1*c*, between the first chamber 1*a* and the third chamber 1*c*. The plunger 2 is in slidable contact with the inner peripheral surface of the cylinder 6.

As illustrated in FIG. 2, an O-ring 93 is interposed between the fuel pump attachment portion 90 and the pump body 1. The O-ring 93 prevents engine oil from leaking to the outside of the engine (internal combustion engine) through between the fuel pump attachment portion 90 and the pump body 1.

A tappet 92 is provided at the lower end of the plunger 2. The tappet 92 converts the rotational motion of the cam 91 attached to the camshaft of the engine into vertical motion and transmits the vertical motion to the plunger 2. The plunger 2 is biased toward the cam 91 by a spring 16 via a retainer 15, and is pressed against the tappet 92. The plunger 2 reciprocates together with the tappet 92 and changes the volume of the pressurization chamber 11.

In addition, a seal holder 17 is disposed between the cylinder 6 and the retainer 15. The seal holder 17 is formed in a tubular shape into which the plunger 2 is inserted. A sub-chamber 17*a* is formed at the upper end of the seal holder 17 on the cylinder 6 side. Meanwhile, the lower end of the seal holder 17 on the retainer 15 side holds a plunger seal 18.

The plunger seal 18 is in slidable contact with the outer periphery of the plunger 2. The plunger seal 18 seals the fuel in the sub-chamber 17*a* when the plunger 2 reciprocates, thereby prevent the fuel in the sub-chamber 17*a* from flowing into the engine. The plunger seal 18 also prevents lubricating oil (including engine oil) for lubricating a sliding portion in the engine from flowing into the pump body 1.

In FIG. 2, the plunger 2 reciprocates in the vertical direction. When the plunger 2 descends, the volume of the pressurization chamber 11 increases, and when the plunger 2 ascends, the volume of the pressurization chamber 11 decreases. That is, the plunger 2 is disposed so as to reciprocate in the directions expanding and contracting the volume of the pressurization chamber 11.

The plunger 2 has a large-diameter portion 2*a* and a small-diameter portion 2*b*. When the plunger 2 reciprocates, the large-diameter portion 2*a* and the small-diameter portion 2*b* are located in the sub-chamber 17*a*. Therefore, the volume of the sub-chamber 17*a* increases or decreases with the reciprocation of the plunger 2.

The sub-chamber 17*a* communicates with a low-pressure fuel chamber 10 through a fuel passage 10*c* (see FIG. 5). When the plunger 2 descends, fuel flows from the sub-chamber 17*a* to the low-pressure fuel chamber 10, and when the plunger 2 ascends, fuel flows from the low-pressure fuel chamber 10 to the sub-chamber 17*a*. Thus, the fuel flow rate into and out of the pump during the suction stroke or the return stroke of the high-pressure fuel pump 100 can be reduced, and the pressure pulsation generated inside the high-pressure fuel pump 100 can be reduced.

In addition, the relief valve mechanism 4 communicating with the pressurization chamber 11 is provided in the second chamber 1*b* of the pump body 1. The relief valve mechanism 4 has a seat member 44, a relief valve 43, a relief valve holder 42, and a relief spring 41. Note that the detailed configuration of the relief valve mechanism 4 will be described later.

As illustrated in FIG. 3, the low-pressure fuel chamber 10 is provided at the top of the pump body 1. In addition, as shown in FIG. 4, the suction joint 5 is attached to the side surface of the pump body 1. The suction joint 5 is connected to the low-pressure pipe 104 (see FIG. 1) that allows passage of the fuel supplied from the fuel tank 103. The fuel in the fuel tank 103 is supplied from the suction joint 5 to the interior of the high-pressure fuel pump 100.

The suction joint 5 has the low-pressure fuel suction port 51 connected to the low-pressure pipe 104 and a suction flow path 52 that communicates with the low-pressure fuel suction port 51. A suction filter 53 is provided in the suction flow path 52. The fuel that has passed through the suction flow path 52 passes through the suction filter 53 provided inside the pump body 1 and is supplied to the low-pressure fuel chamber 10. The suction filter 53 removes foreign substances present in the fuel and prevents foreign substances from entering the high-pressure fuel pump 100.

A low-pressure fuel flow path 10*a* and the suction passage 10*b* (see FIG. 2) are provided in the low-pressure fuel chamber 10. The pressure pulsation reduction mechanism 9 is provided in the low-pressure fuel flow path 10*a*. When the fuel flowing into the pressurization chamber 11 is again returned to the suction passage 10*b* (see FIG. 2) through the electromagnetic suction valve mechanism 3 in a valve open state, pressure pulsation occurs in the low-pressure fuel chamber 10. The pressure pulsation reduction mechanism 9 reduces spreading of pressure pulsation generated in the high-pressure fuel pump 100 to the low-pressure pipe 104.

The pressure pulsation reduction mechanism 9 is formed from a metal diaphragm damper that is configured by two corrugated disk-shaped metal plates being bonded to each other at the outer periphery thereof and that has an interior injected with an inert gas such as argon. The metal diaphragm damper of the pressure pulsation reduction mechanism 9 absorbs or reduces pressure pulsation by expanding/contracting.

The suction passage 10*b* communicates with the suction port 31*b* (see FIG. 2) of the electromagnetic suction valve mechanism 3, and the fuel passing through the low-pressure fuel flow path 10*a* reaches the suction port 31*b* of the electromagnetic suction valve mechanism 3 through the suction passage 10*b*.

As illustrated in FIGS. 2 and 4, the electromagnetic suction valve mechanism 3 is inserted into the suction valve chamber 30 formed in the pump body 1. The suction valve chamber 30 is provided upstream of the pressurization chamber 11 (on the suction passage 10*b* side), and is formed in a lateral hole extending in the horizontal direction. The electromagnetic suction valve mechanism 3 has a suction valve seat 31 press-fitted into the suction valve chamber 30, the suction valve 32, a rod 33, a rod-biasing spring 34, an electromagnetic coil 35, a movable core 36, a stopper 37, and a suction valve-biasing spring 38.

The suction valve seat 31 is formed in a tubular shape, and has an inner periphery on which a seating portion 31*a* is provided. In addition, the suction port 31*b* extending from the outer periphery to the inner periphery is formed in the suction valve seat 31. The suction port 31*b* communicates with the suction passage 10*b* in the low-pressure fuel chamber 10 described above.

In the suction valve chamber 30, the stopper 37 facing the seating portion 31*a* of the suction valve seat 31 is disposed. Furthermore, the suction valve 32 is disposed between the stopper 37 and the seating portion 31*a*. In addition, the suction valve-biasing spring 38 is interposed between the stopper 37 and the suction valve 32. The suction valve-biasing spring 38 biases the suction valve 32 toward the seating portion 31*a*.

The suction valve 32 closes a communication portion between the suction port 31*b* and the pressurization chamber 11 by abutting on the seating portion 31*a*. Thus, the electromagnetic suction valve mechanism 3 is brought into a valve closed state. Meanwhile, the suction valve 32 opens the communication portion between the suction port 31*b* and the pressurization chamber 11 by abutting on the stopper 37. Thus, the electromagnetic suction valve mechanism 3 is brought into the valve open state.

The rod 33 penetrates the cylinder hole of the suction valve seat 31. One end of the rod 33 abuts on the suction valve 32. The rod-biasing spring 34 biases the suction valve 32 in the valve-opening direction, which is toward the stopper 37 side, via the rod 33. One end of the rod-biasing spring 34 is engaged with a flange that is provided on the outer periphery of the rod 33. The other end of the rod-biasing spring 34 is engaged with a magnetic core 39 that is disposed so as to surround the rod-biasing spring 34.

The movable core 36 faces the end face of the magnetic core 39. The movable core 36 is engaged with the flange portion provided on the outer periphery of the rod 33. The electromagnetic coil 35 is disposed so as to circle around the magnetic core 39. A terminal member 40 is electrically connected to the electromagnetic coil 35, and a current flows through the terminal member 40 to the electromagnetic coil 35.

In a non-energized state in which no current flows through the electromagnetic coil 35, the rod 33 is biased in the valve-opening direction by the biasing force of the rod-biasing spring 34, and presses the suction valve 32 in the valve-opening direction. As a result, the suction valve 32 is separated from the seating portion 31*a* and abuts on the stopper 37, and the electromagnetic suction valve mechanism 3 is in the valve open state. That is, the electromagnetic suction valve mechanism 3 is a normally open type that opens in the non-energized state.

In the valve open state of the electromagnetic suction valve mechanism 3, the fuel in the suction port 31*b* passes between the suction valve 32 and the seating portion 31*a*, and flows into the pressurization chamber 11 through a plurality of fuel passage holes (not illustrated) of the stopper 37 and the supply communication hole 1*g* to be described later. In the valve open state of the electromagnetic suction valve mechanism 3, the suction valve 32 comes into contact with the stopper 37, so that the position of the suction valve 32 in the valve-opening direction is restricted. Furthermore, in the valve open state of the electromagnetic suction valve mechanism 3, the gap existing between the suction valve 32 and the seating portion 31*a* is the range of movement of the suction valve 32, which is the valve-opening stroke.

When a control signal from the ECU 101 is applied to the electromagnetic suction valve mechanism 3, a current flows through the terminal member 40 to the electromagnetic coil 35. When the current flows through the electromagnetic coil 35, the movable core 36 is attracted in the valve-closing direction by the magnetic attraction force of the magnetic core 39 on the magnetic attraction surface. As a result, the movable core 36 moves against the biasing force of the rod-biasing spring 34 and comes into contact with the magnetic core 39.

When the movable core 36 is attracted to the magnetic core 39 and moves, the rod 33 moves in the valve-closing direction together with the movable core 36. As a result, the suction valve 32 is released from the biasing force in the valve-opening direction, and moves in the valve-closing direction by the biasing force of the valve-biasing spring 38. Furthermore, when the suction valve 32 comes into contact with the seating portion 31*a* of the suction valve seat 31, the electromagnetic suction valve mechanism 3 is brought into the valve closed state.

As illustrated in FIGS. 4 and 5, the discharge valve mechanism 8 is disposed in a discharge valve chamber 80 that is provided on the outlet side (downstream side) of the pressurization chamber 11. The discharge valve mechanism 8 is equipped with a discharge valve seat member 81, and a discharge valve 82 that comes into contact with and separates from the discharge valve seat member 81. The discharge valve mechanism 8 is also equipped with a discharge valve spring 83 that biases the discharge valve 82 toward the discharge valve seat member 81, and a discharge valve stopper 84 that determines the stroke (moving distance) of the discharge valve 82. In addition, the discharge valve mechanism 8 has a plug 85 that blocks leakage of fuel to the outside.

The discharge valve stopper 84 is press-fitted into the plug 85. The plug 85 is joined to the pump body 1 by welding at a weld 86. The discharge valve chamber 80 is opened and closed by the discharge valve 82. The discharge valve chamber 80 communicates with a discharge valve chamber passage 87. The discharge valve chamber passage 87 is formed in the pump body 1.

In addition, a lateral hole that communicates with the second chamber 1*b* (relief valve chamber) is provided in the pump body 1. The discharge joint 12 is inserted into the lateral hole. The discharge joint 12 has the discharge passage 12*a* that communicates with the lateral hole of the pump body 1 and the discharge valve chamber passage 87, and a fuel discharge port 12*b* that is one end of the discharge passage 12*a*. The fuel discharge port 12*b* of the discharge joint 12 communicates with the common rail 106. Note that the discharge joint 12 is fixed to the pump body 1 by welding with a weld 12*c*.

When there is no fuel pressure difference, so-called fuel differential pressure, between the pressurization chamber 11, and the discharge valve chamber 80 and the discharge valve chamber passage 87, the discharge valve 82 is pressed against the discharge valve seat member 81 by the differential pressure acting on the discharge valve 82 and the biasing force of the discharge valve spring 83. As a result, the discharge valve mechanism 8 is brought into a valve closed state. Meanwhile, when the fuel pressure in the pressurization chamber 11 becomes greater than the fuel pressure in the discharge valve chamber 80 and the discharge valve chamber passage 87 and the differential pressure acting on the discharge valve 82 becomes greater than the biasing force of the discharge valve spring 83, the discharge valve 82 is separated from the discharge valve seat member 81 against the biasing force of the discharge valve spring 83. As a result, the discharge valve mechanism 8 is brought into a valve open state.

When the discharge valve mechanism 8 is in the valve open state, the high-pressure fuel in the pressurization chamber 11 passes through the discharge valve mechanism 8 and reaches the discharge valve chamber 80 and the discharge valve chamber passage 87. Then, the fuel that has reached the discharge valve chamber passage 87 is discharged to the common rail 106 (see FIG. 1) through the fuel discharge port 12*b* of the discharge joint 12. With the above configuration, the discharge valve mechanism 8 functions as a check valve that restricts the flow direction of fuel.

1-2. Operation of Fuel Pump

Next, the operation of the high-pressure fuel pump 100 according to the present embodiment will be described.

When the plunger 2 illustrated in FIG. 1 descends and the electromagnetic suction valve mechanism 3 is open, fuel flows into the pressurization chamber 11 from the supply communication hole 1*g*. Hereinafter, the downward stroke of the plunger 2 will be referred to as a suction stroke. Meanwhile, when the plunger 2 ascends and the electromagnetic suction valve mechanism 3 is closed, the fuel in the pressurization chamber 11 is pressurized, passes through the discharge valve mechanism 8, and is force-fed to the common rail 106 (see FIG. 1). Hereinafter, the process in which the plunger 2 ascends will be referred to as a compression stroke.

As described above, if the electromagnetic suction valve mechanism 3 is closed during the compression stroke, the fuel sucked into the pressurization chamber 11 during the suction stroke is pressurized and discharged to the common rail 106 side. Meanwhile, if the electromagnetic suction valve mechanism 3 is open during the compression stroke, the fuel in the pressurization chamber 11 is pushed back toward the supply communication hole 1*g* and is not discharged to the common rail 106 side. In this manner, the fuel discharge by the high-pressure fuel pump 100 is operated by opening and closing the electromagnetic suction valve mechanism 3. Furthermore, the opening and closing of the electromagnetic suction valve mechanism 3 is controlled by the ECU 101.

In the suction stroke, the volume of the pressurization chamber 11 increases, and the fuel pressure in the pressurization chamber 11 decreases. In this suction stroke, the fluid differential pressure between the pressurization chamber 11 and the suction port 31*b* (see FIG. 2) decreases. Furthermore, when the biasing force of the rod-biasing spring 34 becomes greater than the fluid differential pressure before and after the suction valve 32, the rod 33 moves in the valve-opening direction, the suction valve 32 is separated from the seating portion 31*a* of the suction valve seat 31, and the electromagnetic suction valve mechanism 3 is brought into the valve open state.

The fuel in the suction port 31*b* passes between the suction valve 32 and the seating portion 31*a*, and flows into the pressurization chamber 11 through a plurality of holes provided in the stopper 37.

The high-pressure fuel pump 100 moves to the compression stroke after completing the suction stroke. At this time, the electromagnetic coil 35 remains in the non-energized state, and no magnetic attractive force acts between the movable core 36 and the magnetic core 39. Furthermore, the suction valve 32 is subjected to a biasing force in the valve-opening direction according to the difference in biasing force between the rod-biasing spring 34 and the valve-biasing spring 38 and a pressure force in the valve-closing direction due to the fluid force generated when the fuel flows back from the pressurization chamber 11 to the low-pressure fuel flow path 10*a*.

In order for the electromagnetic suction valve mechanism 3 to maintain the valve open state, the difference in biasing force between the rod-biasing spring 34 and the valve-biasing spring 38 is set to be greater than the fluid force. In this state, even when the plunger 2 moves upward, the rod 33 remains in a valve open position, so that the suction valve 32 biased by the rod 33 also remains in the valve open position. Therefore, the volume of the pressurization chamber 11 decreases with the upward movement of the plunger 2, but in this state, the fuel once sucked into the pressurization chamber 11 is again returned to the suction passage through the electromagnetic suction valve mechanism 3 in the valve open state, and the pressure inside the pressurization chamber 11 does not increase. This stroke is referred to as a return stroke.

In the return process, when a control signal from the ECU 101 (see FIG. 1) is applied to the electromagnetic suction valve mechanism 3, a current flows through the terminal member 40 to the electromagnetic coil 35. When the current flows through the electromagnetic coil 35, a magnetic attraction force acts on the magnetic attraction surfaces of the magnetic core 39 and the movable core 36, and the movable core 36 is attracted to the magnetic core 39. Furthermore, when the magnetic attraction force becomes greater than the biasing force of the rod-biasing spring 34, the movable core 36 moves toward the magnetic core 39 against the biasing force of the rod-biasing spring 34, and the rod 33 engaged with the movable core 36 moves in a direction away from the suction valve 32. As a result, the suction valve 32 is seated on the seating portion 31*a* by the biasing force of the suction valve-biasing spring 38 and the fluid force caused by the fuel flowing into the suction passage 10*b*, and the electromagnetic suction valve mechanism 3 is brought into the valve closed state.

After the electromagnetic suction valve mechanism 3 is brought into the closed state, the fuel in the pressurization chamber 11 is pressurized as the plunger 2 ascends, and when reaching a predetermined pressure or greater, the fuel is discharged through the discharge valve mechanism 8 to the common rail 106 (see FIG. 1). This stroke is referred to as a discharge stroke. That is, the compression stroke between the bottom dead center and the top dead center of the plunger 2 is composed of the return stroke and the discharge stroke. Furthermore, by controlling the timing of energizing the electromagnetic coil 35 of the electromagnetic suction valve mechanism 3, the amount of high-pressure fuel to be discharged can be controlled.

If the timing of energizing the electromagnetic coil 35 is made earlier, the ratio of the return stroke during the compression stroke becomes smaller, and the ratio of the discharge stroke becomes larger. As a result, the amount of fuel returned to the suction passage 10*b* decreases, and the amount of fuel discharged at high pressure increases. Meanwhile, if the timing of energizing the electromagnetic coil 35 is delayed, the ratio of the return stroke during the compression stroke increases, and the ratio of the discharge stroke decreases. As a result, the amount of fuel returned to the suction passage 10*b* increases, and the amount of fuel discharged at high pressure decreases. As described above, by controlling the timing of energizing the electromagnetic coil 35, the amount of fuel discharged at high pressure can be controlled to the amount required by the engine (internal combustion engine).

2. Configuration Example of Relief Valve Mechanism, Shock Wave Absorber, and Supply Communication Hole Next, detailed configurations of the relief valve mechanism 4, the shock wave absorber 1*d*, and the supply communication hole 1*g* will be described.

2-1. Relief Valve Mechanism

First, the configuration of the relief valve mechanism 4 will be described with reference to FIG. 6.

Figure 6:
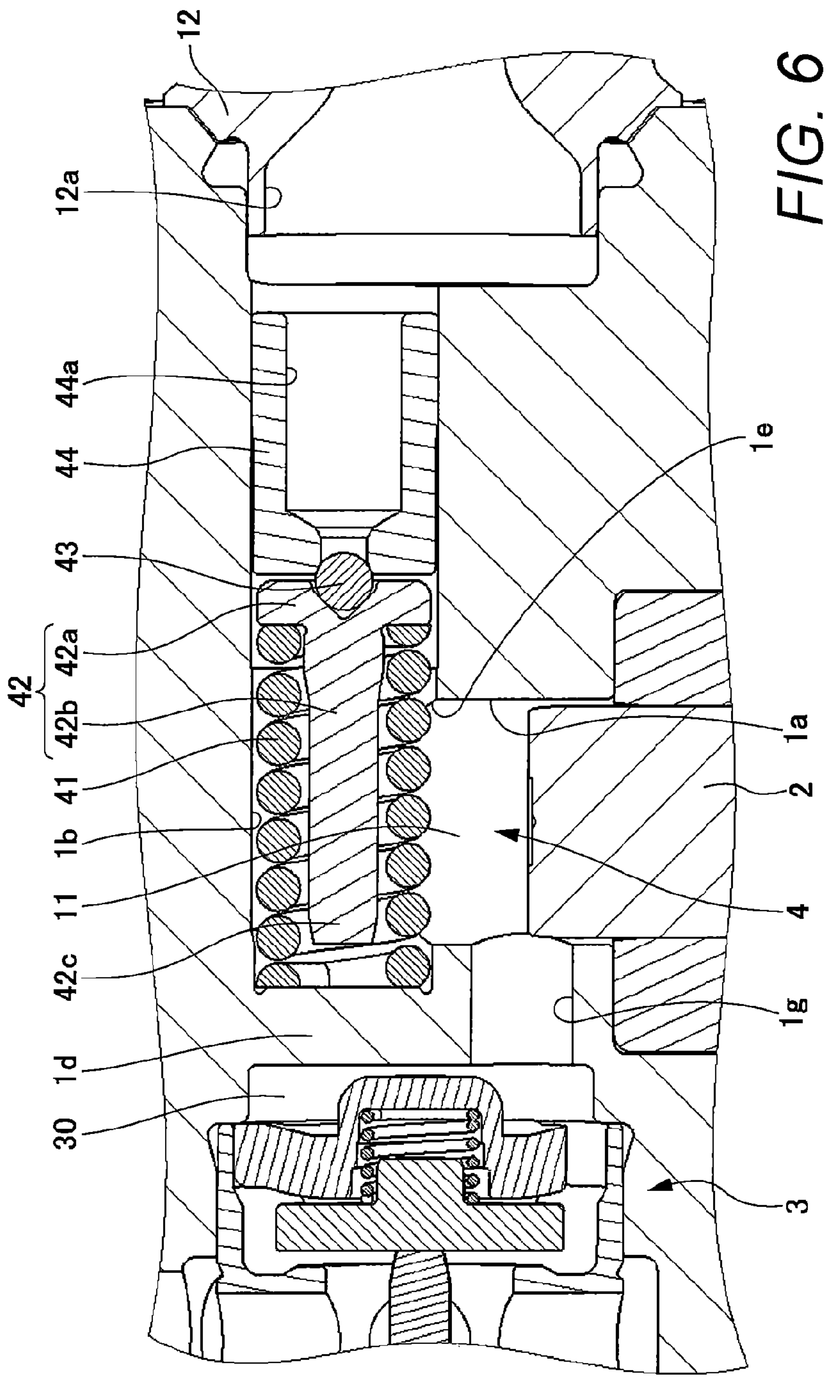
FIG. 6 is an enlarged sectional view illustrating a relief valve mechanism of the high-pressure fuel pump according to the embodiment of the present invention.

FIG. 6 is an enlarged sectional view illustrating the relief valve mechanism 4.

As illustrated in FIG. 6, the relief valve mechanism 4 has the relief spring 41, the relief valve holder 42, the relief valve 43, and the seat member 44. The relief valve mechanism 4 is inserted from the discharge joint 12 and disposed in the second chamber 1*b* (relief valve chamber).

The relief spring 41 is a compression coil spring, and one end thereof abuts on one end of the second chamber 1*b* in the pump body 1. In addition, the other end of the relief spring 41 abuts on the relief valve holder 42. The relief valve holder 42 is engaged with the relief valve 43. Therefore, the biasing force of the relief spring 41 acts on the relief valve 43 through the relief valve holder 42.

The relief valve holder 42 has an abutment portion 42*a* and an insertion portion 42*b* that is continuous with the abutment portion 42*a*. The abutment portion 42*a* is formed in a disk shape having an appropriate thickness. An engagement groove in which the relief valve 43 is engaged is formed in one plane of the abutment portion 42*a*. In addition, on the other plane of the abutment portion 42*a*, the insertion portion 42*b* protrudes, and the other end of the relief spring 41 abuts on the other plane of the abutment portion 42*a*.

The insertion portion 42*b* is formed in a columnar shape and is inserted into the interior of the relief spring 41 in the radial direction. The leading end of the insertion portion 42*b* on the opposite side to the abutment portion 42*a* is formed in a circular flat surface and is disposed near the seat surface of the relief spring 41 which is one end of the relief spring 41. One end of the relief spring 41 is on the opposite side to the insertion side (other end) of the relief spring 41 into which the insertion portion 42*b* is inserted. The insertion portion 42*b* has a tapered portion 42*c*, the outer diameter of which decreases toward the leading end. The tapered portion 42*c* starts from further toward the relief valve 43 side than the portion of the relief spring 41 where a gap is formed between adjacent rings.

The relief spring 41 is interposed in a compressed state between one end of the second chamber 1*b*, that is, the shock wave absorber 1*d* to be described later, and the abutment portion 42*a* of the relief valve holder 42. Furthermore, the relief spring 41, when compressed, biases the relief valve holder 42 and the relief valve 43 toward the seat member 44. Therefore, it is conceivable that adjacent rings come into contact with each other at both ends of the relief spring 41. Even if the tapered portion 42*c* is disposed where the adjacent rings contact each other, the fuel between the relief spring 41 and the tapered portion 42*c* would be restrained from traveling radially outward of the relief spring 41.

Meanwhile, as in the present embodiment, the tapered portion 42*c* is disposed in the portion of the relief spring 41 where a gap is formed between adjacent rings. Thus, the fuel between the relief spring 41 and the tapered portion 42*c* easily travels radially outward of the relief spring 41 from between the adjacent rings of the relief spring 41. As a result, the fuel can be efficiently sucked into the pressurization chamber 11.

The relief valve 43 is pressed by the biasing force of the relief spring 41 and closes the fuel passage 44*a* of the seat member 44. The movement direction of the relief valve 43 and the relief valve holder 42 is orthogonal to the direction in which the plunger 2 reciprocates, and is the same as the movement direction of the suction valve 32 in the electromagnetic suction valve mechanism 3. Furthermore, the centerline of the relief valve mechanism 4 (the centerline of the relief valve holder 42) is orthogonal to the centerline of the plunger 2.

The seat member 44 has the fuel passage 44*a* that faces the relief valve 43, and the opposite side of the fuel passage 44*a* to the relief valve 43 communicates with the discharge passage 12*a*. The movement of the fuel between the pressurization chamber 11 (upstream side) and the seat member 44 (downstream side) is blocked by the relief valve 43 contacting (closely contacting) the seat member 44 to close the fuel passage 44*a*.

When the pressures in the discharge valve chamber 80, the discharge valve chamber passage 87, the common rail 106, and the members ahead thereof increase, the difference from the pressure in the second chamber 1*b* (relief valve chamber) exceeds the preset value. As a result, the fuel on the seat member 44 side presses the relief valve 43, and moves the relief valve 43 against the biasing force of the relief spring 41. As a result, the relief valve 43 opens, and the fuel in the discharge passage 12*a* returns to the pressurization chamber 11 through the fuel passage 44*a* of the seat member 44. Therefore, the pressure for opening the relief valve 43 is determined by the biasing force of the relief spring 41.

The movement direction of the relief valve 43 and the relief valve holder 42 in the relief valve mechanism 4 is different from the movement direction of the discharge valve 82 in the discharge valve mechanism 8 described above. That is, the movement direction of the discharge valve 82 in the discharge valve mechanism 8 is the first radial direction of the pump body 1, and the movement direction of the relief valve 43 in the relief valve mechanism 4 is the second radial direction different from the first radial direction of the pump body 1. Thus, the discharge valve mechanism 8 and the relief valve mechanism 4 can be arranged at positions not overlapping each other in the vertical direction, and the space inside the pump body 1 can be effectively used to downsize the pump body 1.

2-2. Shock Wave Absorber and Supply Communication Hole

Next, the detailed configurations of the shock wave absorber 1*d* and the supply communication hole 1*g* will be described with reference to FIGS. 6, 7A, and 7B.

Figure 7A:
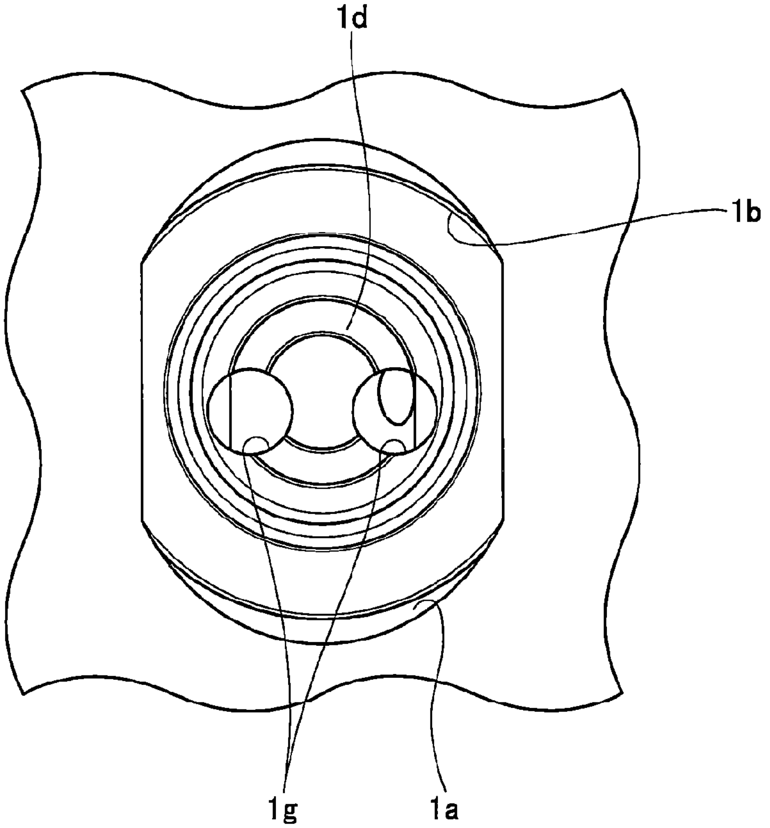
FIG. 7A is a front view illustrating the shock wave absorber and the supply communication hole.
Figure 7B:
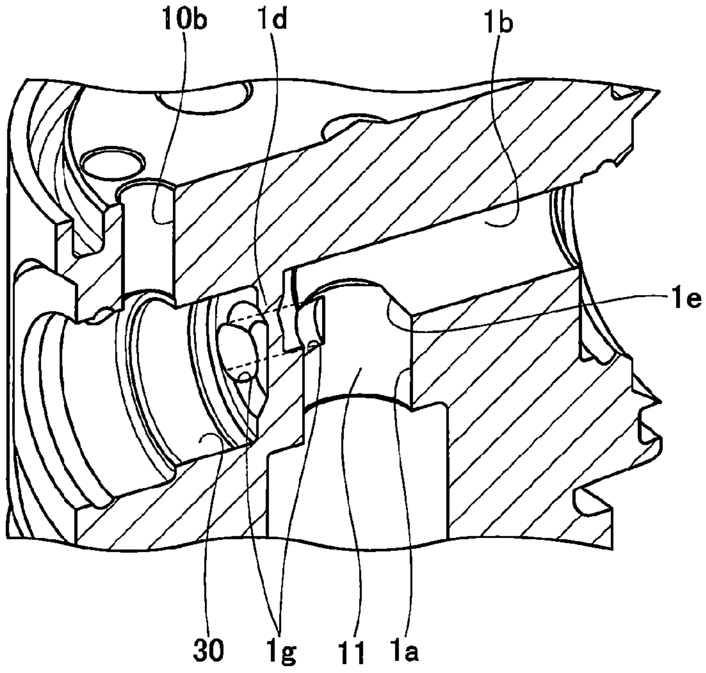
FIG. 7B is a perspective view illustrating the shock wave absorber and the supply communication hole.

FIG. 7A is a front view illustrating the shock wave absorber 1*d* and the supply communication hole 1*g*, and FIG. 7B is a perspective view illustrating the shock wave absorber 1*d* and the supply communication hole 1*g*.

As illustrated in FIGS. 6 and 7A, the shock wave absorber 1*d* is provided in the second chamber 1*b* serving as a relief valve chamber. The shock wave absorber 1*d* is disposed between the suction valve chamber 30 and the second chamber 1*b* in the pump body 1. Furthermore, in this example, the shock wave absorber 1*d* is configured as a wall forming the second chamber 1*b*, that is, a wall separating the suction valve chamber 30 and the second chamber 1*b*. The shock wave absorber 1*d* prevents fuel from flowing directly between the second chamber 1*b* serving as a relief valve chamber and the suction valve chamber 30.

In addition, as illustrated in FIG. 6, the shock wave absorber 1*d* faces the leading end of the insertion portion 42*b* of the relief valve holder 42. The other end of the relief spring 41 on the opposite side to the one end thereof that abuts on the abutment portion 42*a* of the relief valve holder 42 abuts on the shock wave absorber 1*d*. That is, the shock wave absorber 1*d* is disposed on the downstream side in the direction in which the relief valve holder 42 moves when the relief valve mechanism 4 is released.

Here, when the pressures in the discharge valve chamber 80, the discharge valve chamber passage 87, the common rail 106, and the members ahead thereof increase and the difference from the pressure in the second chamber 1*b* (relief valve chamber) exceeds the preset value, the relief valve 43 opens. Then the fuel in the discharge passage 12*a* passes through the fuel passage 44*a* of the seat member 44.

In addition, when the relief valve 43 opens, a shock wave traveling along the axial direction of the insertion portion 42*b* of the relief valve holder 42 is generated. As described above, the shock wave absorber 1*d* is provided at the axial end of the insertion portion 42*b*. Therefore, the shock wave generated when the relief valve 43 opens travels along the axial direction of the insertion portion 42*b* of the relief valve holder 42 and collides with the shock wave absorber 1*d*.

Thus, the shock wave generated when the relief valve 43 opens can be absorbed by the shock wave absorber 1*d*. As a result, it is possible to prevent each mechanical component, such as the pressure pulsation reduction mechanism 9 and the low-pressure pipe 104, arranged upstream of the relief valve mechanism 4, from being damaged by the shock wave generated when the relief valve mechanism 4 is released.

Note that in the present example, an example in which the shock wave absorber 1*d* is a wall provided in the pump body 1 has been described, but the present invention is not limited thereto. The shock wave absorber 1*d* may be, for example, a flange provided in the insertion portion 42*b* of the relief valve holder 42, or may be a protrusion protruding from the inner wall surface of the second chamber 1*b* serving as a relief valve chamber. That is, it is sufficient if the shock wave absorber 1*d* is provided at a position facing the movement direction of the relief valve holder 42. Note that the number of components can be reduced by using the shock wave absorber 1*d* as a wall that separates the second chamber 1*b* serving as a relief valve chamber and the suction valve chamber 30.

Further, the shock wave absorber 1*d* is not limited to a planar member, and may be, for example, a cone-shaped recess, the diameter of which decreases along the travel direction of the shock wave.

In addition, as illustrated in FIGS. 6, 7A, and 7B, the first chamber 1*a*, which constitutes the pressurization chamber 11, and the suction valve chamber 30 communicate with each other through the two supply communication holes 1*g*. The two supply communication holes 1*g* extend in a direction orthogonal to the centerline of the first chamber 1*a*. In addition, the two supply communication holes 1*g* are formed closer to the plunger 2 than the communication hole 1*e* that allows the first chamber 1*a* and the second chamber 1*b* to communicate with each other. Furthermore, the two supply communication holes 1*g* are connected to the side surface of the first chamber 1*a*.

In addition, as illustrated in FIG. 6, the open ends of the two supply communication holes 1*g* are located further toward the second chamber 1*b* side than the end of the plunger 2, that is, upstream of the plunger 2 in the movement direction, at the upper start point of the plunger 2 where the volume of the pressurization chamber 11 is minimized. That is, at the upper start point of the plunger 2 where the volume of the pressurization chamber 11 is minimized, the two supply communication holes 1*g* are formed at positions not closed by the side peripheral surface of the plunger 2.

Furthermore, as the plunger 2 moves toward the lower start point where the volume of the pressurization chamber 11 is maximized, the areas of the supply communication holes 1*g* communicating with the pressurization chamber increase. Thus, regardless of the position of the plunger 2, the pressurization chamber 11 and the suction valve chamber 30 can communicate with each other through the supply communication holes 1*g*. As a result, the flow rate of the fuel from the suction valve chamber 30 to the pressurization chamber 11 or from the pressurization chamber 11 to the suction valve chamber 30 can be sufficiently ensured.

In addition, when the plunger 2 moves downward to suck fuel from the suction valve chamber 30 into the pressurization chamber 11, the pressure loss is large, and the fuel pressure becomes smaller than a saturated vapor pressure, there is a problem that some of the fuel is vaporized, and the pressurization chamber 11 is not completely filled with liquid, resulting in a decrease in volumetric efficiency. The volumetric efficiency is the ratio of the discharge amount of the fuel discharged from the discharge valve mechanism 8 to the moving distance from the lower start point of the plunger 2 where the volume of the pressurization chamber 11 is maximized to the upper start point of the plunger 2 where the volume of the pressurization chamber 11 is minimized.

In contrast, as described above, the supply communication holes 1*g* allow sufficient fuel flow rate from the suction valve chamber 30 to the pressurization chamber 11 or from the pressurization chamber 11 to the suction valve chamber 30, thereby allowing a reduction in pressure loss.

Further, the opening areas of the two supply communication holes 1*g* that allow communication between the pressurization chamber 11 and the suction valve chamber 30 are set to be smaller than the opening area of the communication hole 1*e* that allows communication between the pressurization chamber 11 and the second chamber 1*b* serving as a relief valve chamber. Thus, the shock wave generated when the relief valve mechanism 4 is released can be attenuated not only by the shock wave absorber 1*d* but also by the supply communication holes 1*g*. As described above, by using the pressurization chamber 11 as a space for attenuating shock waves, it is not necessary to separately provide a space for attenuation, and the entire device can be downsized.

Further, the axial direction of the opening axes of the two supply communication holes 1*g* intersects the axial direction of the opening axes of the first chamber 1*a* and the communication hole 1*e*. Thus, the transmission of shock waves generated in the second chamber 1*b* to the suction valve chamber 30 can be further attenuated.

Figure 8A:
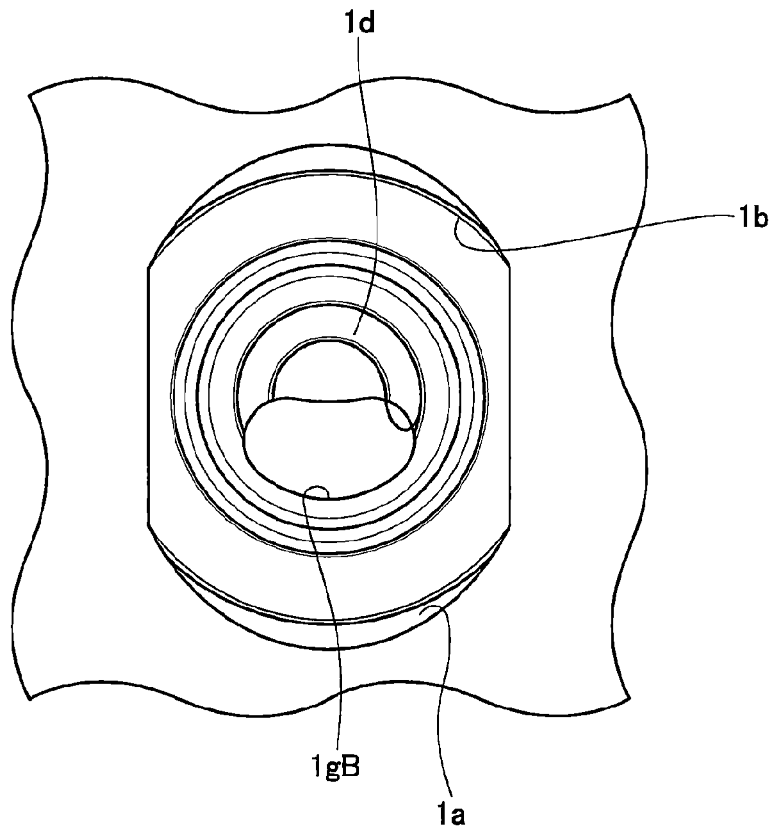
FIG. 8A is a front view illustrating the shock wave absorber and the supply communication hole.
Figure 8B:
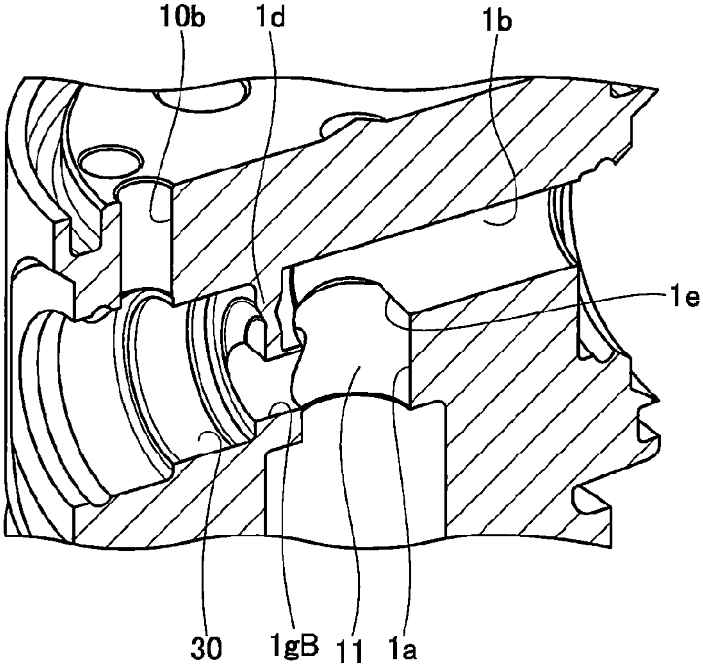
FIG. 8B is a perspective view illustrating the shock wave absorber and the supply communication hole.

Note that the supply communication hole 1*g* is not limited to the above-described example, and various other shapes can be applied as illustrated in FIGS. 8A and 8B described later.

FIGS. 8A and 8B illustrate a modification of the supply communication hole.

The supply communication hole 1*g*B illustrated in FIGS. 8A and 8B is formed in a substantially elliptical shape like two circular communication holes combined. Furthermore, the supply communication hole 1*g*B allows communication between the first chamber 1*a*, which constitutes the pressurization chamber 11, and the suction valve chamber 30. Note that other configurations are similar to those of the supply communication holes 1*g* illustrated in FIGS. 7A and 7B, and thus the description thereof will be omitted. Also in the supply communication hole 1*g*B shown in FIGS. 8A and 8B, it is possible to provide the same operational effects as those of the supply communication holes 1*g* shown in FIGS. 7A and 7B.

The embodiment of the fuel pump of the present invention has been described above including the operational effects thereof. However, the fuel pump according to the present invention is not limited to the above-described embodiment, and various modifications can be made without departing from the gist of the invention described in the claims. In addition, the above-described embodiment has been described in detail in order to describe the present invention in an easy-to-understand manner, and is not necessarily limited to one equipped with all the described configurations.

In addition, in the embodiment described above, the second chamber 1*b*, serving as a relief valve chamber, and the suction valve chamber 30 are adjacent to each other, and the centerline of the second chamber 1*b* and the centerline of the suction valve chamber 30 are arranged in the same plane. However, the present invention is not limited to this. The second chamber 1*b*, serving as a relief valve chamber, and the suction valve chamber 30 may exist on different planes, and for example, the centerline of the second chamber 1*b* and the centerline of the suction valve chamber 30 may be angled instead of parallel. In addition, the centerline of the second chamber 1*b* and the centerline of the suction valve chamber 30 are parallel but may be offset, or the centerline of the second chamber 1*b* and the centerline of the suction valve chamber 30 may be offset and even angled instead of parallel.

Note that in the present specification, words such as "parallel" and "orthogonal" are used, but these do not mean only strictly "parallel" and "orthogonal", and may include "parallel" and "orthogonal" and even be in a state of "substantially parallel" or "substantially orthogonal" within the range in which the functions can be exhibited.

REFERENCE SIGNS LIST

1 pump body
1*a* first chamber
1*b* second chamber (relief valve chamber)
1*c* third chamber
1*d* shock wave absorber
1*e* communication hole
1*f* tapered surface
1*g*, 1*g*B supply communication hole
2 plunger
3 electromagnetic suction valve mechanism
4 relief valve mechanism
5 suction joint
6 cylinder
8 discharge valve mechanism
9 pressure pulsation reduction mechanism (damper)
10 low-pressure fuel chamber
10*a* low-pressure fuel flow path
10*b* suction passage
10*c* fuel passage
11 pressurization chamber
12 discharge joint
30 suction valve chamber
31 suction valve seat
31*a* seating portion
31*b* suction port
32 suction valve
41 relief spring
42 relief valve holder
42*a* abutment portion
42*b* insertion portion
42*c* tapered portion
43 relief valve
44 seat member
44*a* fuel passage
51 low-pressure fuel suction port
52 suction flow path
53 suction filter
80 discharge valve chamber
87 discharge valve chamber passage
100 high-pressure fuel pump
101 ECU
102 feed pump
103 fuel tank
104 low-pressure pipe
105 fuel pressure sensor
106 common rail
107 injector

The invention claimed is:

1. A fuel pump comprising:
a damper;
a suction valve chamber that communicates with the damper through a suction passage;
a pressurization chamber that is formed downstream of the suction valve chamber;
a relief valve chamber that is formed downstream of the pressurization chamber;
a relief valve mechanism that is disposed in the relief valve chamber and has a relief valve holder;
a shock wave absorber that is provided in the relief valve chamber and is disposed to face the relief valve holder on a downstream side in a direction in which the relief valve holder moves when the relief valve mechanism is released;
a communication hole that allows communication between the relief valve chamber and the pressurization chamber; and
a supply communication hole that allows communication between the pressurization chamber and the suction valve chamber are formed; wherein
an opening area of the supply communication hole is smaller than an opening area of the communication hole.

2. The fuel pump according to claim 1, wherein
the relief valve mechanism has:
a relief valve that engages with the relief valve holder; and
a relief spring having one end that abuts on the relief valve holder and another end that abuts on the shock wave absorber.

3. The fuel pump according to claim 1, wherein
the shock wave absorber is a wall formed in the relief valve chamber.

4. The fuel pump according to claim 3, wherein the shock wave absorber is the wall that separates the relief valve chamber and the suction valve chamber.

5. The fuel pump according to claim 1, further comprising a plunger that is inserted into the pressurization chamber and increases or decreases a volume of the pressurization chamber, wherein at an upper start point of the plunger where the volume of the pressurization chamber is minimized, the supply communication hole is formed at a position not closed by a side peripheral surface of the plunger.

6. The fuel pump according to claim 1, wherein an axial direction of an opening axis of the supply communication hole intersects an axial direction of opening axes of the pressurization chamber and the communication hole.

* * * * *